(12) United States Patent
Chang et al.

(10) Patent No.: US 11,555,493 B2
(45) Date of Patent: Jan. 17, 2023

(54) FRACTURING EQUIPMENT

(71) Applicant: YANTAI JEREH PETROLEUM EQUIPMENT & TECHNOLOGIES CO., LTD., Yantai Shandong (CN)

(72) Inventors: Sheng Chang, Yantai Shandong (CN); Liang Lv, Yantai Shandong (CN); Shuzhen Cui, Yantai Shandong (CN); Chunqiang Lan, Yantai Shandong (CN); Jian Zhang, Yantai Shandong (CN); Xiaolei Ji, Yantai Shandong (CN); Huaizhi Zhang, Yantai Shandong (CN); Ruijie Du, Yantai Shandong (CN)

(73) Assignee: YANTAI JEREH PETROLEUM EQUIPMENT & TECHNOLOGIES CO., LTD, Yantai (CN)

( * ) Notice: Subject to any disclaimer, the term of this patent is extended or adjusted under 35 U.S.C. 154(b) by 10 days.

(21) Appl. No.: 17/170,141

(22) Filed: Feb. 8, 2021

(65) Prior Publication Data
US 2022/0186724 A1    Jun. 16, 2022

(30) Foreign Application Priority Data

Dec. 11, 2020   (CN) .......................... 202022996839.9

(51) Int. Cl.
*F04B 53/00*    (2006.01)
*F04B 53/08*    (2006.01)
(Continued)

(52) U.S. Cl.
CPC ............ *F04B 53/002* (2013.01); *F04B 17/03* (2013.01); *F04B 53/003* (2013.01); *F04B 53/08* (2013.01);
(Continued)

(58) Field of Classification Search
CPC ...... F04B 17/03; F04B 53/001; F04B 53/002; F04B 53/003; F04B 53/08; F04B 53/18; E21B 43/2607; H02K 5/24
See application file for complete search history.

(56) References Cited

U.S. PATENT DOCUMENTS

| 3,794,377 A | 2/1974 | Wachsmuth et al. |
| 3,815,965 A | 6/1974 | Ostwald |

(Continued)

FOREIGN PATENT DOCUMENTS

| CN | 104033247 A | 9/2014 |
| CN | 207829871 U | 9/2018 |

(Continued)

OTHER PUBLICATIONS

International Search Report dated Sep. 2, 2021, for International Application No. PCT/CN2020/135860, 4 pages.

(Continued)

*Primary Examiner* — Charles G Freay

(57) ABSTRACT

The present disclosure provides a fracturing equipment. The fracturing equipment includes: a plunger pump, a main motor and a noise reduction device. The plunger pump is used for pressurizing liquid. The main motor is connected to the plunger pump by transmission for providing driving force to the plunger pump. The noise reduction device is constructed as a cabin structure and covers outside the main motor and isolates the main motor from the plunger pump. With the fracturing equipment according to the present disclosure, the fracturing equipment is driven by the main motor with relatively low noise during operation. The noise reduction device isolates the main motor from the outside, which can effectively reduce the noise intensity transmitted to the outside during operation, thereby achieve the effect of noise reduction. In addition, the plunger pump is isolated (Continued)

from the main motor by the noise reduction device, thus realizing isolation of high-pressure dangerous areas and ensuring safe operation.

17 Claims, 5 Drawing Sheets

(51) Int. Cl.
*E21B 43/26* (2006.01)
*F04B 53/18* (2006.01)
*F04B 17/03* (2006.01)
*H02K 5/24* (2006.01)
*F04B 15/02* (2006.01)

(52) U.S. Cl.
CPC .......... *F04B 53/18* (2013.01); *E21B 43/2607* (2020.05); *F04B 15/02* (2013.01); *H02K 5/24* (2013.01)

(56) References Cited

U.S. PATENT DOCUMENTS

| | | | |
|---|---|---|---|
| 4,201,523 A | 5/1980 | Olofsson | |
| 4,793,775 A | 12/1988 | Peruzzi | |
| 5,453,647 A * | 9/1995 | Hedeen | H02K 5/24 181/240 |
| 5,846,056 A | 12/1998 | Dhindsa et al. | |
| 6,134,878 A | 10/2000 | Amako et al. | |
| 7,679,232 B2 * | 3/2010 | Kakimoto | H02K 5/24 181/202 |
| 10,514,205 B2 | 12/2019 | Hjorth et al. | |
| 11,109,508 B1 | 8/2021 | Yeung et al. | |
| 11,125,066 B1 | 9/2021 | Yeung et al. | |
| 11,220,895 B1 | 1/2022 | Yeung et al. | |
| 11,378,008 B2 | 7/2022 | Yeung et al. | |
| 11,391,136 B2 | 7/2022 | Coli et al. | |
| 2003/0064858 A1 | 4/2003 | Saeki et al. | |
| 2005/0093496 A1 | 5/2005 | Tokunou et al. | |
| 2010/0135840 A1 | 6/2010 | Fujimoto et al. | |
| 2014/0219824 A1 | 8/2014 | Burnette | |
| 2017/0285062 A1 | 10/2017 | Kim | |
| 2017/0292789 A1 * | 10/2017 | Hjorth | F28D 1/0452 |
| 2018/0328157 A1 | 11/2018 | Bishop | |
| 2019/0100989 A1 | 4/2019 | Stewart et al. | |
| 2019/0128265 A1 | 5/2019 | Washio et al. | |
| 2020/0040878 A1 | 2/2020 | Morris | |
| 2020/0049136 A1 | 2/2020 | Stephenson | |
| 2020/0325760 A1 | 10/2020 | Markham | |
| 2021/0040830 A1 | 2/2021 | Mu et al. | |
| 2021/0040836 A1 * | 2/2021 | Baskin | F04B 53/18 |
| 2021/0095648 A1 | 4/2021 | Buckley et al. | |
| 2021/0102530 A1 | 4/2021 | Pruitt et al. | |
| 2021/0199161 A1 | 7/2021 | Eto et al. | |
| 2021/0396120 A1 * | 12/2021 | Rother | E21B 43/2607 |
| 2022/0112892 A1 * | 4/2022 | Cui | F04B 53/16 |

FOREIGN PATENT DOCUMENTS

| | | | |
|---|---|---|---|
| CN | 109882144 A | | 6/2019 |
| CN | 110454285 A | | 11/2019 |
| CN | 211819660 U | | 10/2020 |
| DE | 102013208455 A1 * | | 11/2014 |
| KR | 20110045161 A * | | 5/2011 |
| WO | WO 2015/030757 A1 | | 3/2015 |

OTHER PUBLICATIONS

Non-Final Office Action for U.S. Appl. No. 17/733,922 dated Sep. 21, 2022.

* cited by examiner

FRACTURING EQUIPMENT

CROSS REFERENCE TO RELATED APPLICATION

The application claims priority to the Chinese patent application No. 202022996839.9, filed on Dec. 11, 2020, the entire content of which is incorporated herein by reference.

FIELD

The present disclosure generally relates to a fracturing system.

BACKGROUND

Fracturing is the core technology for oilfield stimulation in conventional reservoirs and oilfield exploitation in unconventional reservoirs such as shale gas, shale oil and coal-bed methane. Nowadays, the production of shale gas mostly adopts factory fracturing mode and zipper-type multi-well uninterrupted fracturing mode, which requires fracturing equipment to be capable of continuous operation for a long time. Currently, some fracturing equipment each is driven by a diesel engine which needs to be equipped with a gearbox and a transmission shaft. The equipment is large in size and the operation noise is very loud when the engine and gearbox work. Some other fracturing equipment is driven by an electric motor, and when the motor is running, the electromagnetic, cooling and exhaust devices are very noisy. As the fracturing equipment generates loud noise during operation, resulting in noise pollution, normal rest of residents around the well site will be affected, thus the fracturing equipment cannot meet the requirements of 24-hour continuous operation, especially normal operation at night.

Therefore, there is a need for a fracturing equipment to at least partly solve the foregoing problems.

SUMMARY

An objective of the present disclosure is to provide a fracturing equipment.

According to an aspect of the present disclosure, there is provided a fracturing equipment, comprising:

a plunger pump for pressurizing liquid;

a main motor connected to the plunger pump by transmission and configured to provide driving force to the plunger pump; and a noise reduction device configured as a cabin structure, wherein the noise reduction device covers outside the main motor and isolates the main motor from the plunger pump.

According to the present disclosure, the fracturing equipment is driven by the main motor. Hence the noise during operation is low. The main motor is isolated from outside by the noise reduction device, which can effectively reduce the noise intensity transmitted to the outside during operation, thereby achieving the effect of noise reduction. In addition, the plunger pump is isolated from the main motor, thus realizing isolation of high-pressure dangerous areas and ensuring safe operation.

In one embodiment, the fracturing equipment further comprises:

an oil tank containing lubricating oil; and a lubrication driving device for driving lubricating oil from the oil tank to the plunger pump to lubricate the plunger pump;

wherein, the lubrication driving device includes a lubrication pump and a lubrication motor, the lubrication pump and/or the lubrication motor being arranged inside the noise reduction device.

According to the present disclosure, the noise generated during operation of the lubrication pump and the lubrication motor can be reduced while lubricating the plunger pump.

In one embodiment, the fracturing equipment comprises:

a cooler having a fan and configured to dissipate heat from the lubricating oil by means of air blast cooling; and a cooler motor connected to the cooler by transmission and configured to provide a driving force to the cooler;

wherein the cooler and the cooler motor are arranged inside the noise reduction device.

According to the present disclosure, the noise generated during the operation of the cooler motor can be reduced while cooling the lubricating oil.

In one embodiment, the cooler is arranged above the main motor, and the top of the noise reduction device is provided with a cooler window at a position corresponding to the cooler.

According to the present disclosure, the cooler window can enhance the heat exchange between the cooler and the outside, thus enhancing the heat dissipation capability.

In one embodiment, the cooler is configured as a cuboid and comprises at least two fans arranged along a length direction.

According to the present disclosure, the cooler is adapted to be integrally arranged inside the noise reduction device, and the heat dissipation capability can be correspondingly enhanced as the number of fans increases.

In one embodiment, the main motor comprises a cooling fan configured to cool the main motor by means of air suction cooling.

According to the present disclosure, air suction cooling can effectively reduce noise when cooling the main motor.

In one embodiment, the fracturing equipment further comprises a primary exhaust silencer which is arranged inside the noise reduction device and is connected with an exhaust port of the cooling fan.

According to the present disclosure, the primary exhaust silencer can reduce the noise generated by the cooling fan during exhausting.

In one embodiment, the exhaust port of the cooling fan is connected to the primary exhaust silencer via a soft connection.

According to the present disclosure, the soft connection has lower requirement on alignment precision, so that the connection is more convenient and installation and subsequent maintenance is easy. Furthermore, the soft connection can compensate the displacement caused by vibration during operation, and achieve noise reduction and shock absorption meanwhile.

In one embodiment, a flow area of an airflow passage in the soft connection gradually increases along an air flow direction.

According to the present disclosure, the exhaust can be smoother.

In one embodiment, the fracturing equipment further comprises a secondary exhaust silencer which is provided on the noise reduction device and corresponds to an exhaust port of the primary exhaust silencer.

According to the present disclosure, the secondary exhaust silencer can further reduce the noise generated by the primary exhaust silencer during exhausting.

In one embodiment, at least one side of the noise reduction device is provided with at least one air inlet where an air inlet silencer is provided.

According to the present disclosure, the air inlet can meet the demand of air intake, and the air inlet silencer can reduce noise generated during air intake process. In addition, the air inlet silencer is integrally installed with the noise reduction device, so that the overall structure can be compact.

In one embodiment, an outer surface of the main motor is wrapped with a noise reduction material.

According to the present disclosure, the noise generated by the main motor during operation can be further reduced.

In one embodiment, a wall of the noise reduction device is constructed as a sandwich structure filled with a noise reduction material.

According to the present disclosure, the noise reduction effect of the noise reduction device can be enhanced.

BRIEF DESCRIPTION OF THE DRAWINGS

For the sake of better understanding on the above and other objectives, features, advantages, and functions of the present disclosure, the preferred embodiments are provided with reference to the drawings. The same reference symbols refer to the same components throughout the drawings. It would be appreciated by those skilled in the art that the drawings are merely provided to illustrate preferred embodiments of the present disclosure, without suggesting any limitation to the protection scope of the present disclosure, and respective components therein are not necessarily drawn to scale.

Figure 1:
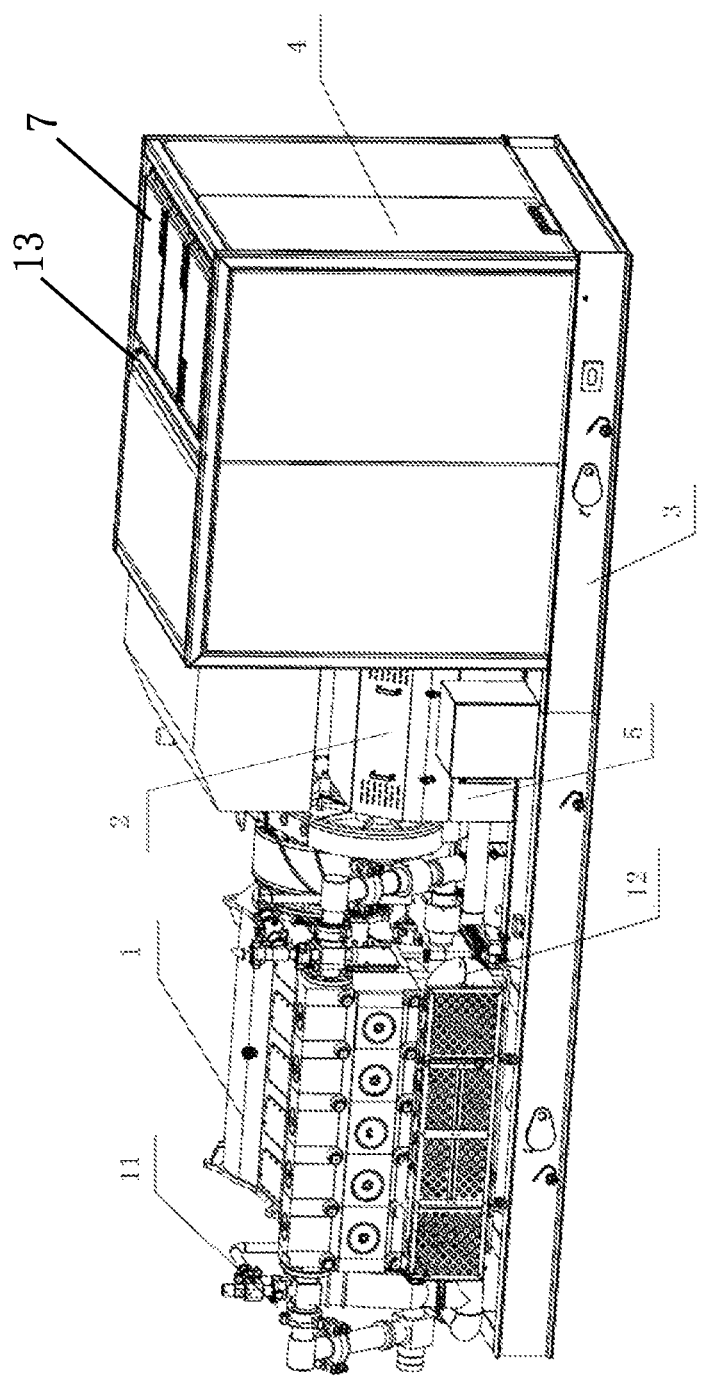
FIG. 1 is a perspective view of a fracturing equipment according to a preferred embodiment of the present disclosure.

LIST OF REFERENCE SIGNS 1 plunger pump
2 transmission device
3 carrier
4 noise reduction device
5 oil tank
6 main motor
7 cooler
8 primary exhaust silencer
9 secondary exhaust silencer
10 air inlet silencer
11 high-pressure pipeline
12 low-pressure pipeline
13 cooler window
14 cooling fan
15 lubrication driving device

DETAILED DESCRIPTION OF EMBODIMENTS

Reference now will be made to the drawings to describe embodiments of the present disclosure. What will be described herein are only preferred embodiments according to the present disclosure. On the basis, those skilled in the art would envision other embodiments of the present disclosure which all fall into the scope of the present disclosure.

The present disclosure provides a fracturing equipment for fracturing operation at the well site. The fracturing equipment according to the present disclosure will be described in detail below with reference to the drawings.

Figure 2:
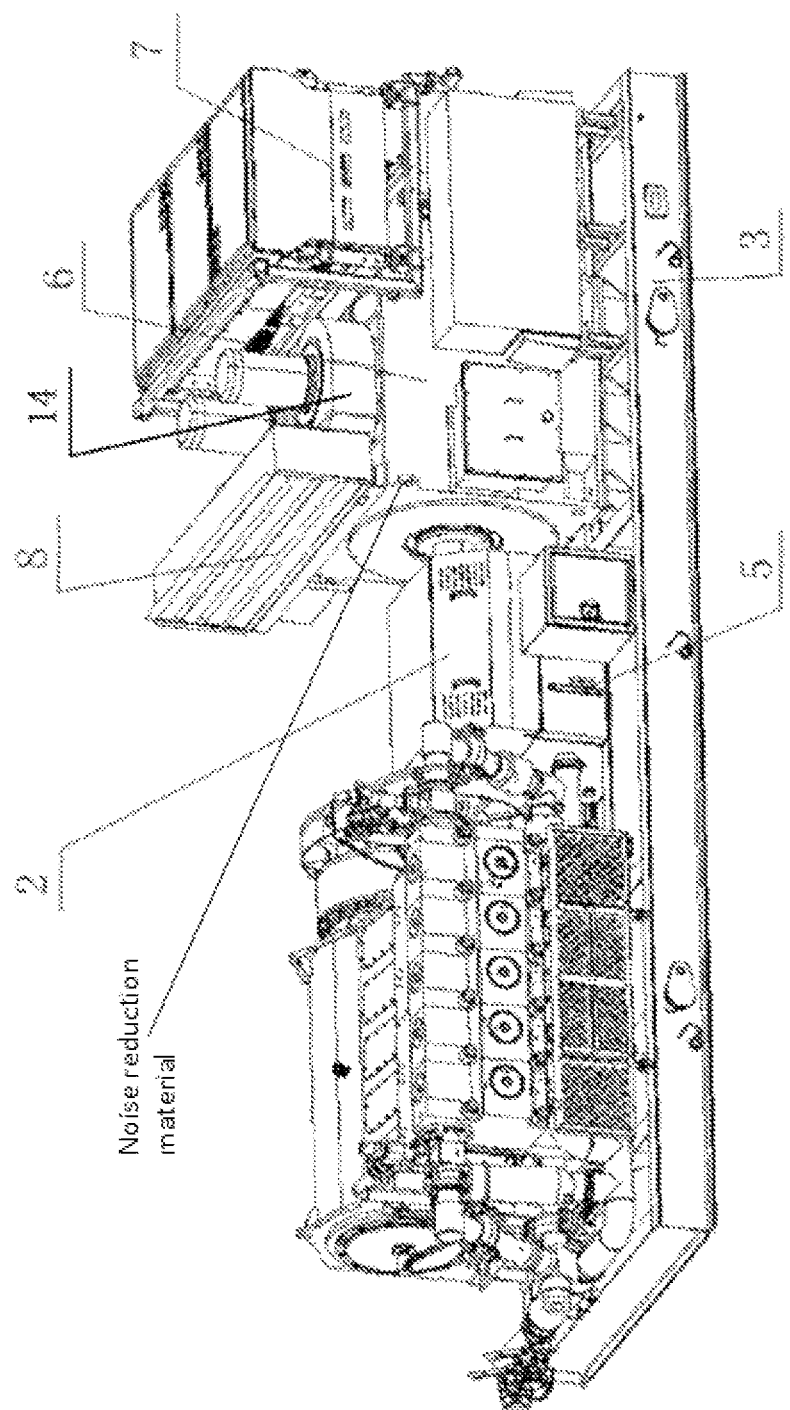
FIG. 2 is another perspective view of the fracturing equipment shown in FIG. 1 with the noise reduction device omitted.

FIGS. 1 and 2 illustrate one preferred embodiment of the fracturing equipment according to the present disclosure, comprising a plunger pump 1 and a main motor 6. The plunger pump 1 is used for pressurizing liquid with its liquid inlet end being connected to a low-pressure pipeline 12 for inputting low-pressure liquid into the plunger pump 1. A liquid outlet end of the plunger pump 1 is connected to a high-pressure line 11 which is used for discharging the pressurized liquid from the plunger pump 1. The main motor 6 is connected to the plunger pump 1 via a transmission device 2 such as transmission shaft or shaft coupling to provide driving force to the plunger pump 1. Compared with diesel engine driving, electric driving can obviously reduce the noise generated during operation.

Figure 3:
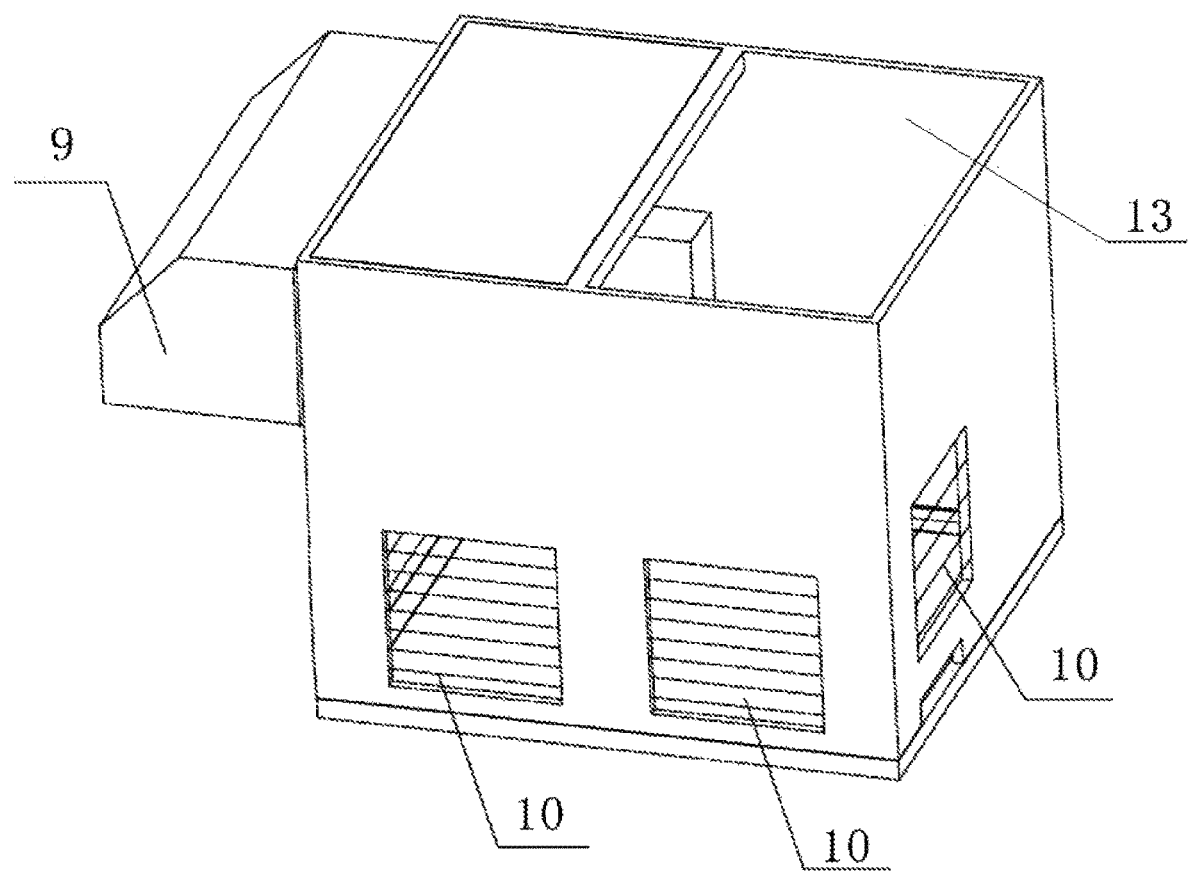
FIG. 3 a perspective view of the noise reduction device of the fracturing equipment shown in FIG. 1.

According to the present disclosure, the fracturing equipment further comprises a noise reduction device 4. As shown in FIGS. 1 and 3, the noise reduction device 4 is configured as a cabin structure, which covers outside the main motor 6 and isolates the main motor 6 from the plunger pump 1 and the transmission device 2. On the one hand, the noise reduction device 4 can reduce the intensity of noise transmitted to the outside during operation of the main motor 6; On the other hand, the noise reduction device 4 can isolate the high-voltage hazardous area where the main motor 6 is located, thus ensuring safety during operation. The thickness of the wall of the noise reduction device 4 is greater than or equal to 5 mm, so as to increase the structural strength of the noise reduction device 4 while isolating noise, thereby protecting the internal devices.

Preferably, the wall of the noise reduction device 4 is constructed as a sandwich structure which is filled with a noise reduction material. Such a structure can further reduce the noise intensity transmitted from the inside of the noise reduction device 4 to the outside. The noise-reducing material can be a porous, loose and breathable material, which is able to absorb noise. More specifically, the noise reduction material can be one or more of polyester fiber, aluminum silicate cotton, rubber plate, urea formaldehyde foam plastic and the like, which can be flexibly selected according to actual needs. In addition, the main motor 6 may also be wrapped by the above-mentioned noise reduction material to achieve a further noise reduction effect.

Still referring to FIG. 2, the fracturing equipment also includes an oil tank 5, a lubrication pump and a lubrication motor. The oil tank 5 contains lubricating oil and is fluidly connected to the plunger pump 1. The lubricating oil is used to lubricate the plunger pump 1. The lubrication pump is respectively fluidly connected with the oil tank 5 and the plunger pump 1 for driving the lubricating oil to flow, and the lubrication motor is connected to the lubrication pump by transmission to provide a driving force to the lubrication pump. According to the present disclosure, the lubrication pump and the lubrication motor are arranged in the noise reduction device 4, so as to reduce noise transmitted to the outside during operation. Preferably, the lubrication pump and the lubrication motor can be integrated as one device, such as the lubrication drive device 15 shown in FIG. 5.

Figure 5:
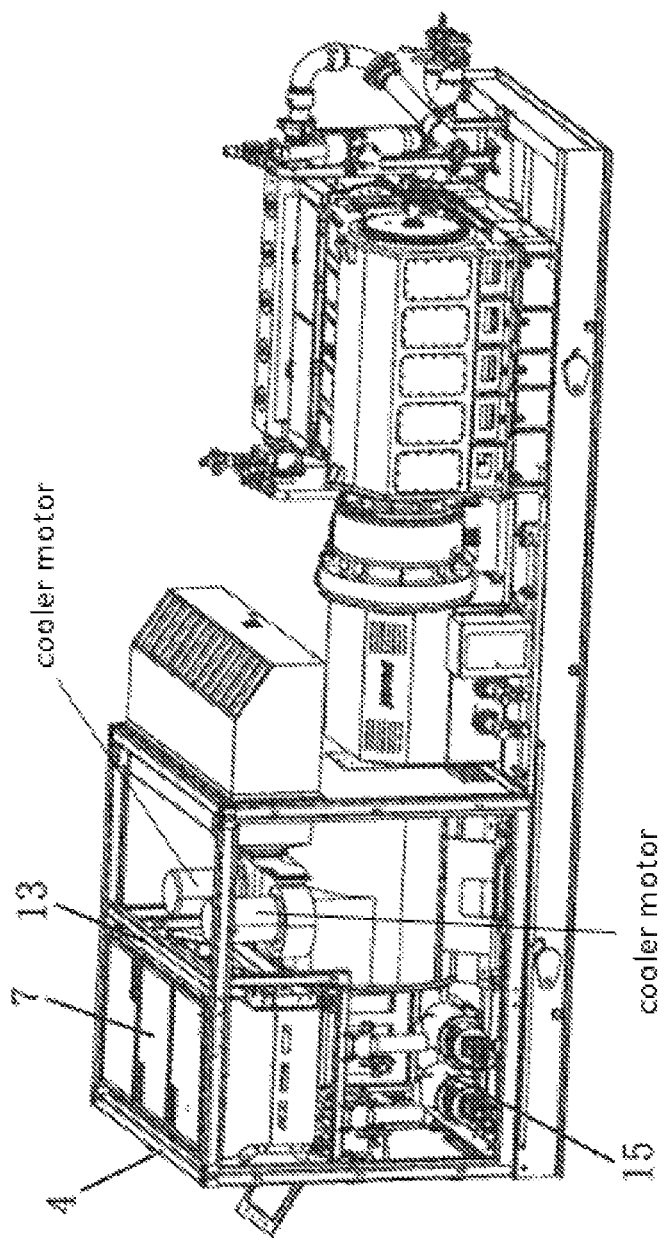
FIG. 5 is another perspective view of the fracturing equipment shown in FIG. 1.

The lubricating oil can also takes away the heat generated by the operation of the plunger pump 1, playing a cooling role while providing lubrication. Therefore, the lubricating oil is at a relatively high temperature after flowing out of the plunger pump 1 and needs to be cooled down. According to the present disclosure, the fracturing equipment further comprises a cooler 7 with a fan, which can cool the lubricating oil by means of air blast cooling. In addition, the fracturing equipment also includes a cooler motor that drives the fan. As shown in FIG. 5, the fan and the cooler motor are integrated in the cooler 7. The cooler 7 is arranged inside the noise reduction device 4 so as to reduce the noise intensity transmitted to the outside during operation.

As shown in FIGS. 2 and 5, the cooler 7 is preferably constructed in a cuboid structure, which is arranged above the main motor 6 within the noise reduction device 4. In this way, the cooler 7 can be arranged more flexibly under the condition that the space inside the noise reduction device 4 is limited. Furthermore, there can be at least two fans arranged along the length direction of the cooler 7, and more fans can be arranged within a limited space to improve the heat dissipation capability. Still referring to FIGS. 1 and 3, preferably, a cooler window 13 is provided at the top of the noise reduction device 4 at a position corresponding to the cooler 7. The top of the radiator 7 can dissipate heat outward through the cooler window 13.

As shown in FIG. 2, the main motor 6 includes a cooling fan 14 which cools the main motor 6 by means of air suction cooling. Compared with the conventional air blast cooling method, the noise intensity generated by air suction cooling is lower during operation. The cooling fan 14 is arranged inside the noise reduction device 4 together with the main motor 6 to facilitate its connection with the main motor 6 such that the air inlet of the cooling fan 14 can be arranged at a position corresponding to the main motor 6, and furthermore, the noise reduction device 4 can also reduce the intensity of noise transmitted to the outside during the operation of the cooling fan 14.

Preferably, the fracturing equipment further includes a primary exhaust silencer 8, which is arranged inside the noise reduction device 4 and connected with an exhaust port of the cooling fan 14. The airflow discharged from the cooling fan 14 enters the primary exhaust silencer 8, so that the noise generated by the air flow can be reduced.

Figure 4:
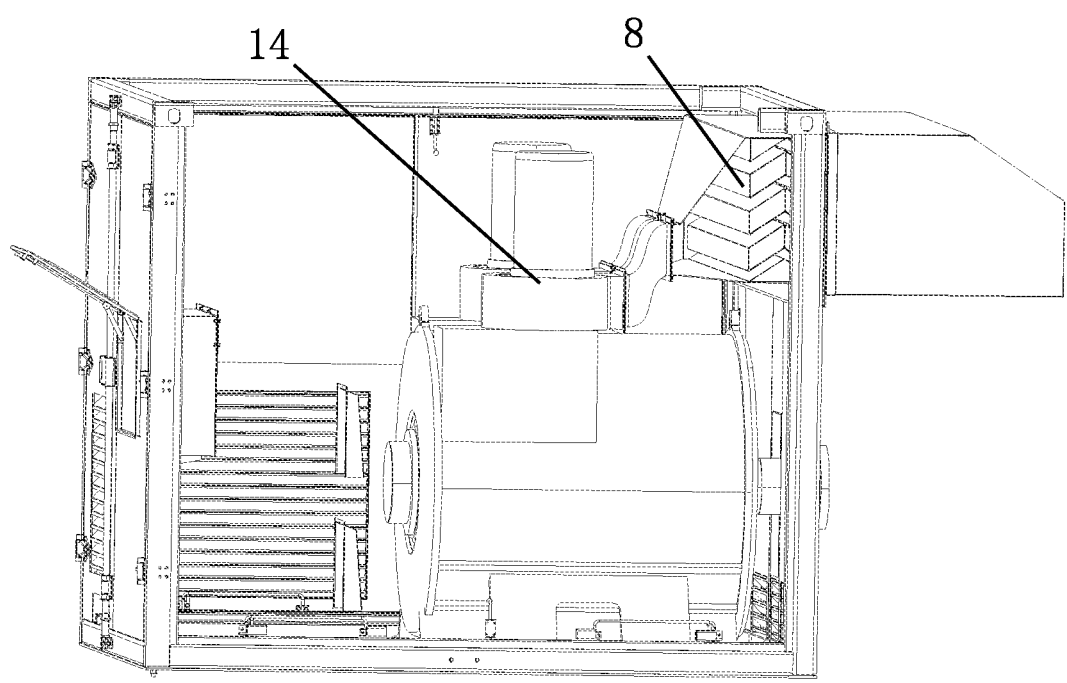
FIG. 4 is a partial view of vertical section of the fracturing equipment shown in FIG. 1.

As shown in FIG. 4, the exhaust port of the cooling fan 14 can be connected to the primary exhaust silencer 8 via a soft connection. More specifically, a flexible material such as rubber can be applied to form a connecting exhaust channel between the exhaust port of the cooling fan 14 and the primary exhaust silencer 8. Compared with the hard connection method, the soft connection has lower requirements on the positioning accuracy between devices, so that the connection is simpler and more convenient for installation and maintenance. In addition, the soft connection can also compensate the displacement caused by vibration between the cooling fan 14 and the primary exhaust silencer 8 during operation, thereby preventing the primary exhaust silencer 8 from being damaged.

Preferably, an exhaust channel formed by the soft connection is configured such that a flow area of the exhaust channel gradually increases along an air flow direction from the cooling fan 14 toward the primary exhaust silencer 8, which makes air flows more smoothly. In one embodiment, the soft connection can be designed to be tapered to achieve such technical effects.

More preferably, the fracturing equipment also includes a secondary exhaust silencer 9 which corresponds to an exhaust port of the primary exhaust silencer 8. The airflow discharged from the primary exhaust silencer 8 enters the secondary exhaust silencer 9, and then is discharged into the outside after noise reduction by the secondary exhaust silencer 9. Therefore, the exhaust noise of the cooling fan 14 is reduced to the greatest extent by dual noise reduction of the primary exhaust silencer 8 and the secondary exhaust silencer 9. Preferably, the secondary exhaust silencer 9 can be integrated within the noise reduction device 4 so as to make the structure compact and easy to install.

As shown in FIG. 3, the side surface of the noise reduction device 4 is provided with an air inlet, and an air inlet silencer 10 is provided at the position of the air inlet. Such arrangement can meet the air intake requirements of the cooling fan 4 and the cooler 7, and the noise intensity generated by the airflow flowing through the air inlet can be reduced by the air inlet silencer 10. Preferably, under the premise of ensuring the strength, safety and noise reduction effect, the air inlet and corresponding air inlet silencer 10 may be provided on each side of the noise reduction device 4. In addition, according to area size, each side surface may be provided with more than one air inlets and corresponding air inlet silencers 10.

Preferably, the fracturing equipment may further comprise a carrier 3. The foregoing devices are integrally installed on the carrier 3, so that the fracturing equipment forms a whole, thereby being more convenient to transport. In the illustrated embodiment, the carrier 3 may be a skid-mounted base. While in other embodiments the carrier may also be a chassis vehicle or semi-trailer.

According to the present disclosure, the fracturing equipment is provided with a noise reduction device which covers outside power devices such as the main motor, the lubrication motor, the cooler, the cooler motor and the like and isolates these devices that generate loud noises during operation from the outside environment, thus reducing the noise intensity transmitted to the outside. Meanwhile, the plunger pump can be isolated from the foregoing power equipment to isolate the high-pressure dangerous area and ensure safe operation. Noise reduction material is wrapped outside the main motor and filled within the wall of the noise reduction device. In addition, the main motor is set to dissipate heat by means of air suction cooling, and dual exhaust silencers are provided at the exhaust port of the cooling fan of the main motor, which can further reduce the noise generated by the main motor. By arranging an air inlet silencer on the noise reduction device, the noise generated by the air intake of the cooler and the air suction cooling of the main motor is effectively reduced while meeting the air intake requirements of power equipment.

The foregoing description on the various embodiments of the present disclosure has been presented to those skilled in the relevant fields for purposes of illustration, but are not intended to be exhaustive or limited to a single embodiment disclosed herein. As aforementioned, many substitutions and variations will be apparent to those skilled in the art. Therefore, although some alternative embodiments have been described above, those skilled in the art can still envision or develop other embodiments much more easily. The present disclosure is intended to cover all substitutions, modifications and variations of the present disclosure as described herein, as well as other embodiments falling into the spirits and scope of the present disclosure.

We claim:
1. A fracturing equipment, comprising:
   a plunger pump for pressurizing liquid;
   a main motor connected to the plunger pump by a transmission and configured to provide a driving force to the plunger pump;

a noise reduction device configured as a cabin structure, wherein the noise reduction device covers the main motor and isolates the main motor from the plunger pump;

an oil tank containing lubricating oil; and a lubrication driving device for driving lubricating oil from the oil tank to the plunger pump to lubricate the plunger pump, wherein the lubrication driving device includes a lubrication pump and a lubrication motor, and wherein the lubrication pump or the lubrication motor is arranged inside the noise reduction device.

2. The fracturing equipment according to claim 1, wherein the fracturing equipment further comprises:

a primary exhaust silencer connected with an exhaust port of a cooling fan configured to cool the main motor, wherein the exhaust port of the cooling fan is connected to the primary exhaust silencer via a soft connection, and wherein a flow area of an airflow passage in the soft connection gradually increases along an airflow direction.

3. The fracturing equipment according to claim 1, wherein the fracturing equipment further comprises:

a cooler having a fan and configured to dissipate heat from the lubricating oil by air blast cooling; and a cooler motor connected to the cooler and configured to provide the driving force to the cooler;

wherein, the cooler and the cooler motor are arranged inside the noise reduction device.

4. The fracturing equipment according to claim 3, wherein the cooler is arranged above the main motor, and a top of the noise reduction device is provided with a cooler window at a position corresponding to the cooler.

5. The fracturing equipment according to claim 3, wherein the cooler is configured as a cuboid and comprises at least two fans arranged along a length of the cuboid.

6. The fracturing equipment according to claim 3, wherein at least one side of the noise reduction device is provided with at least one air inlet, and an air inlet silencer is provided at the at least one air inlet.

7. The fracturing equipment according to claim 1, wherein the main motor comprises a cooling fan configured to cool the main motor through air suction cooling.

8. The fracturing equipment according to claim 7, wherein the fracturing equipment comprises a primary exhaust silencer arranged inside the noise reduction device and connected with an exhaust port of the cooling fan.

9. The fracturing equipment according to claim 8, wherein the exhaust port of the cooling fan is connected to the primary exhaust silencer via a soft connection.

10. The fracturing equipment according to claim 8, wherein the fracturing equipment further comprises a secondary exhaust silencer which is provided on the noise reduction device and corresponds to an exhaust port of the primary exhaust silencer.

11. The fracturing equipment according to claim 1, wherein an outer surface of the main motor is wrapped with a noise reduction material.

12. The fracturing equipment according to claim 1, wherein a wall of the noise reduction device is constructed as a sandwich structure filled with a noise reduction material.

13. A fracturing equipment, comprising:

a plunger pump for pressurizing liquid;

a main motor connected to the plunger pump by a transmission and configured to provide a driving force to the plunger pump;

a noise reduction device configured as a cabin structure, wherein the noise reduction device covers the main motor and isolates the main motor from the plunger pump;

a cooling fan configured to cool the main motor; and a primary exhaust silencer arranged inside the noise reduction device and connected with an exhaust port of the cooling fan, wherein the exhaust port of the cooling fan is connected to the primary exhaust silencer via a soft connection, and wherein a flow area of an airflow passage in the soft connection gradually increases along an airflow direction.

14. A fracturing equipment, comprising:

a plunger pump for pressurizing liquid;

a main motor connected to the plunger pump by a transmission and configured to provide a driving force to the plunger pump;

a noise reduction device configured as a cabin, wherein the noise reduction device covers the main motor and isolates the main motor from the plunger pump;

an oil tank containing lubricating oil;

a lubrication driving device for driving lubricating oil from the oil tank to the plunger pump to lubricate the plunger pump, wherein the lubrication driving device includes a lubrication pump and a lubrication motor;

a cooler having a fan and configured to dissipate heat from the lubricating oil; and a cooler motor connected to the cooler and configured to provide the driving force to the cooler, wherein the cabin covers the cooler and the cooler motor.

15. The fracturing equipment according to claim 14, wherein the cabin covers the lubrication pump or the lubrication motor.

16. The fracturing equipment according to claim 14, wherein a top of the cabin is provided with a cooler window at a position corresponding to the cooler.

17. The fracturing equipment according to claim 14, wherein the cooler comprises at least two fans.

\* \* \* \* \*